(12) United States Patent
Morihisa et al.

(10) Patent No.: US 8,648,961 B2
(45) Date of Patent: Feb. 11, 2014

(54) IMAGE CAPTURING APPARATUS AND IMAGE CAPTURING METHOD

(75) Inventors: Taijiro Morihisa, Tokyo (JP); Tatsutoshi Kitajima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 314 days.

(21) Appl. No.: 13/190,005

(22) Filed: Jul. 25, 2011

(65) Prior Publication Data

US 2012/0019708 A1   Jan. 26, 2012

(30) Foreign Application Priority Data

Jul. 23, 2010 (JP) ................................. 2010-165674

(51) Int. Cl.
*H04N 5/232* (2006.01)
(52) U.S. Cl.
USPC .......................................... 348/350; 348/349
(58) Field of Classification Search
USPC ................. 348/345, 349, 350, 353, 354, 356; 396/79, 80
See application file for complete search history.

(56) References Cited

U.S. PATENT DOCUMENTS

| 4,591,919 | A  | * | 5/1986  | Kaneda et al.    | 348/348 |
| 7,079,188 | B2 | * | 7/2006  | Shiraishi et al. | 348/350 |
| 7,834,929 | B2 | * | 11/2010 | Okawara          | 348/347 |
| 2002/0080259 | A1 | * | 6/2002 | Izumi            | 348/348 |

FOREIGN PATENT DOCUMENTS

| JP | 2001-221945 | 8/2001 |
| JP | 2006-72384  | 3/2006 |

* cited by examiner

*Primary Examiner* — Tuan Ho
(74) *Attorney, Agent, or Firm* — Oblon, Spivak, McClelland, Maier & Neustadt, L.L.P.

(57) ABSTRACT

An image capturing apparatus has a function of automatically focusing on an object to be photographed. The apparatus includes a first image-obtaining unit that includes a picture-taking lens which includes a focusing lens, and a first imaging sensor to obtain a first image of the object; a second image-obtaining unit that includes a range-finding lens and a second imaging sensor to obtain a second image of the object; a range finder that calculates a distance to the object by using the first image data and the second image data; and a focus control unit that moves the focusing lens according to the distance calculated by the range finder to attain focus on the object. The range finder includes an image-forming-position determining unit which determines a first image forming position and a second image forming position, based on which a distance calculating unit calculates a distance to the object.

13 Claims, 10 Drawing Sheets

OBJECT X

OBJECT X

IMAGE CAPTURING APPARATUS AND IMAGE CAPTURING METHOD

CROSS-REFERENCE TO RELATED APPLICATIONS

The present application claims priority to and incorporates by reference the entire contents of Japanese Patent Application No. 2010-165674 filed in Japan on Jul. 23, 2010.

BACKGROUND OF THE INVENTION

1. Field of the Invention

The present invention relates to image capturing apparatuses and methods.

2. Description of the Related Art

Known examples of an image capturing apparatus with an automatic focusing mechanism include image capturing apparatuses that include, in addition to an optical system (hereinafter, "first optical system") for obtaining an object image, another optical system (hereinafter, "second optical system) for measuring a distance to an object to be photographed by triangulation. Each of the first optical system and the second optical system includes a lens; the lenses are located away from each other on the image capturing apparatus. Parallax between the two lenses located away from each other causes an object image obtained through one of the two lenses to differ from that obtained through the other lens. In particular, when a distance between the object and the image capturing apparatus is small, there can be a case that although an object image obtained through the lens of the first optical system is at a center of an angle of view, an object image obtained through the lens of the second optical system is displaced from the center of the angle of view. There can be even a case where the object image obtained through the lens of the second optical system falls out of the angle of view.

An effect of the parallax is described below with reference to FIGS. 11A to 11D. FIG. 11A schematically illustrates an image capturing apparatus 100 directed toward an object X1 as viewed from a back side of the apparatus. The object X1 is displayed on a display unit 120 provided on the back side of the image capturing apparatus 100. Referring to FIG. 11A, a rectangular area (a range-finding area 400) displayed on a center portion of the object X1 is an image data area to be used in computation for measuring a distance to the object. The range-finding area 400 can be determined according to a point on the display unit 120 touched by a photographer, or, alternatively, a preset area.

The relationship between the first optical system and the second optical system is further described below. The second optical system is tilted so that, for instance, the range-finding area 400 is close to a center of an object image (close to a center of the angle of view of the first optical system) when located at a distance La from the object as illustrated in FIG. 11B. When the second optical system is at a distance Lb (La<Lb) from the object, as illustrated in FIG. 11C, the range-finding area 400 is displaced to a lower-left direction on the display unit 120. When the object X1 is photographed by zooming in at the distance Lb to the object X1, the range-finding area 400 is further displaced. The image capturing apparatus 100 calculates the distance to the object using image data in the range-finding area 400. Accordingly, when the range-finding area 400 is displaced from an object to be focused, photographing in desired focus cannot be achieved.

An image capturing apparatus that determines a distance to an object by the triangulation has a parallax-related problem as described above. Difference between the angle of view of the first optical system and that of the second optical system is adjusted at a manufacturing stage of the image capturing apparatus and cannot be adjusted when taking photographs. An image capturing apparatus with a high-magnification zoom function calculates a focal length by a different method than the triangulation described above because an influence of the parallax is likely to be more serious in such an image capturing apparatus than in an image capturing apparatus without a high-magnification zoom function. An influence of the parallax cannot be removed, either, in an image capturing apparatus with interchangeable lenses in which a mechanism such as hill-climbing autofocusing (AF) method, which is different from the triangulation, is adopted for automatically focusing on an object.

The hill-climbing AF method is a method for determining an in-focus position as a position at which a contrast value, obtained by computation on image data while gradually moving the lens of the first optical system, is maximized. However, the hill-climbing AF method involves a motion of a picture-taking lens; accordingly, when the picture-taking lens has a long focal length, a traveling distance of the picture-taking lens becomes long, resulting in relatively long autofocusing time.

Under such circumstances, image capturing apparatuses that perform autofocusing by using a hybrid method, which is a combination of the triangulation and the hill-climbing AF method, have been proposed (see, for instance, Japanese Patent Application Laid-open No. 2001-221945 and Japanese Patent Application Laid-open No. 2006-072384).

In the hybrid methods, a picture-taking lens is moved to a position in accordance with an object distance measured by the triangulation; thereafter, the hill-climbing AF method is used to move the picture-taking lens, within a predetermined range, in a vicinity of the position to which the picture-taking lens has been moved. The hybrid method allows, even when there is a certain degree of parallax, an in-focus position to be determined accurately by the hill-climbing AF method. This method also shortens the moving distance of the picture-taking lens and hence saves time required for autofocusing because the hill-climbing AF method is performed in the predetermined moving range after an approximate in-focus position has been determined by the triangulation.

The apparatus disclosed in Japanese Patent Application Laid-open No. 2001-221945 changes an AF area for use in the hill-climbing AF method in accordance with multi-point focusing areas determined by an AF unit. The apparatus disclosed in Japanese Patent Application Laid-open No. 2006-072384 switches an AF area for use in the hill-climbing AF method in accordance with a distance to an object. In each of these apparatuses, the range-finding area to be focused in the hill-climbing AF method needs to be an area corresponding to a range-finding angle of view of the second optical system having a fixed focal point.

As described above, an image capturing apparatus that measures a distance to an object by the triangulation determines a focal point less accurately due to parallax between an image-capturing optical system and an AF optical system. Some type of recent models of image capturing apparatuses displays an object image on a display unit to allow a photographer to designate a to-be-focused position on the display unit. Other type is configured to automatically identify a face in an object image and automatically designates a position of the face as a range-finding area. The object image displayed on the display unit is obtained with an image-capturing optical system. Hence, an image capturing apparatus, that is capable of correcting an influence of parallax in calculation of a focal length by using an AF optical system and obtaining a more accurate focal length irrespective of what range-finding area is designated in an object image obtained with an image-capturing optical system, has been desired.

SUMMARY OF THE INVENTION

It is an object of the present invention to at least partially solve the problems in the conventional technology. According to an aspect of the present invention, there is provided an image capturing apparatus having an automatic focusing function for automatically focusing on an object to be photographed. The image capturing apparatus includes a first image-obtaining unit that includes a picture-taking lens, the picture-taking lens including a focusing lens, and a first imaging sensor and obtains first image data by photoelectric conversion, performed by the first imaging sensor, of a first image of the object formed through the picture-taking lens; a second image-obtaining unit that includes a range-finding lens and a second imaging sensor and obtains second image data by photoelectric conversion, performed by the second imaging sensor, of a second image of the object formed through the range-finding lens; a range finder that calculates a distance to the object by using the first image data and the second image data; and a focus control unit that moves the focusing lens according to the distance calculated by the range finder to attain focus on the object. The range finder includes an image-forming-position determining unit that determines a first image forming position, at which the first image of the object is formed on a light-receiving surface of the first image sensor, and a second image forming position, at which the second image of the object is formed on a light-receiving surface of the second image sensor; and a distance calculating unit that calculates a distance to the object based on the first image forming position and the second image forming position.

According to another aspect of the present invention, there is provided an image capturing method performed by an image capturing apparatus having an automatic focusing function. The image capturing apparatus includes a first image-obtaining unit that includes a picture-taking lens, the picture-taking lens including a focusing lens, and a first imaging sensor and obtains first image data by photoelectric conversion, performed by the first imaging sensor, of a first image of the object formed through the picture-taking lens; a second image-obtaining unit that includes a range-finding lens and a second imaging sensor and obtains second image data by photoelectric conversion, performed by the second imaging sensor, of a second image of the object formed through the range-finding lens; a range finder that calculates a distance to the object by using the first image data and the second image data; and a focus control unit that moves the focusing lens to attain focus on the object according to the distance calculated by the range finder. The range finder includes an image-forming-position determining unit that determines a first image forming position, at which the first image of the object is formed on a light-receiving surface of the first image sensor, and a second image forming position, at which the second image of the object is formed on a light-receiving surface of the second image sensor; and a distance calculating unit that calculates a distance to the object by using the first image forming position and the second image forming position. The image capturing method includes determining, by the image-forming-position determining unit, the first image forming position, at which the first image of the object is formed on the light-receiving surface of the first image sensor, and the second image forming position, at which the second image of the object is formed on the light-receiving surface of the second image sensor; and calculating, by the distance calculating unit, the distance to the object by using the first image forming position and the second image forming position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are external drawings illustrating an image capturing apparatus according to an embodiment of the present invention, while

FIG. 10 is a flowchart of still another example illustrating an image capturing process to be performed by the image capturing apparatus according to the embodiment.

DETAILED DESCRIPTION OF THE PREFERRED EMBODIMENTS

Exemplary embodiments of the present invention will be described with reference to the accompanying drawings below.

Figure 1A:
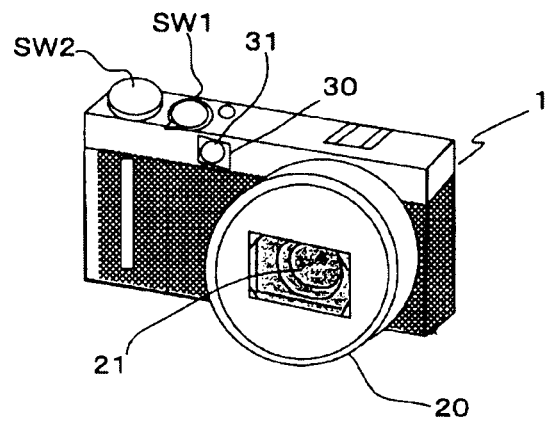
Figure 1B:
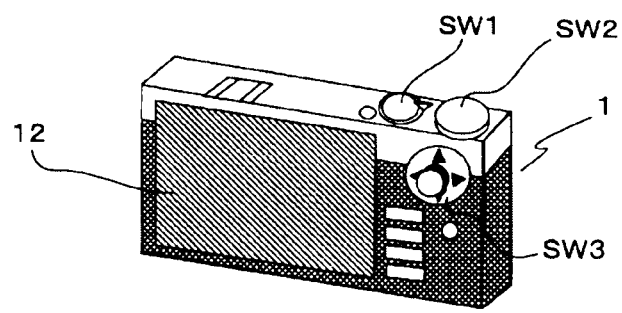

FIG. 1A is an external drawing of an image capturing apparatus 1 according to an embodiment of the present invention as viewed from a front side. FIG. 1B is an external drawing of the image capturing apparatus 1 as viewed from a back side. Referring to FIG. 1A, the image capturing apparatus 1 includes, on the front side, an image-capturing optical system 20, which serves as a first image-obtaining unit, and an AF optical system 30, which serves as a second image-obtaining unit. The image-capturing optical system 20 includes a first image sensor for obtaining an object image through a picture-taking lens 21 that includes a focusing lens. The AF optical system 30 includes a second image sensor for obtaining an object image through a range-finding lens 31. Image data obtained by the image-capturing optical system 20 is hereinafter referred to as primary image data. Image data obtained by the AF optical system 30 is referred to as AF image data. The image-capturing optical system 20 and the AF optical system 30 are positioned away from each other on the image capturing apparatus 1.

Referring to FIG. 1B, a release button SW1, which is a shutter switch, and a mode dial SW2 for selecting a photographing mode are provided on a top surface of the image capturing apparatus 1. The release button SW1 including two internal switches is configured to issue a first release signal when the release button SW1 is pressed halfway and to issue a second release signal when fully pressed.

Referring to FIG. 1B, a display unit 12, on which an object image (live view image) obtained by the image-capturing optical system 20 is to be displayed, and a jog switch SW3 for configuring various setting information related to operations of the image capturing apparatus 1 are provided on the back side of image capturing apparatus 1. The display unit 12 is used also for displaying various setting information related to the operations of the image capturing apparatus 1.

Figure 1C:
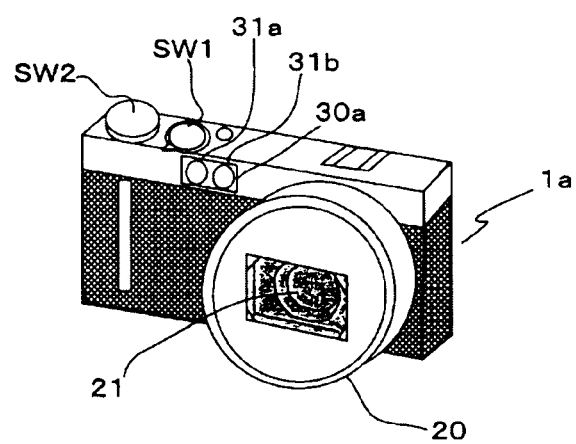
Figure 10:
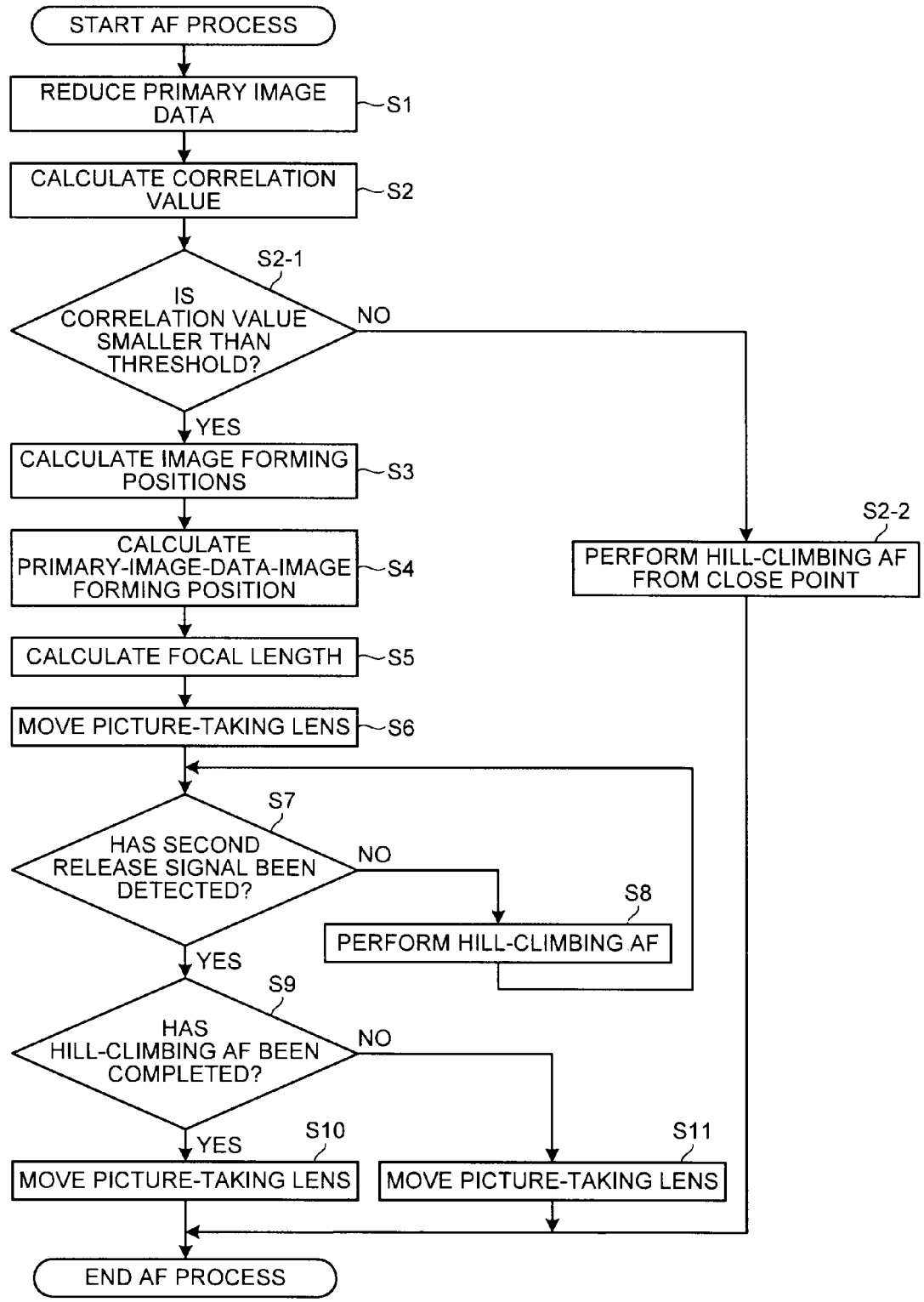
FIG. 10 illustrates a first modification of the image capturing apparatus.
Figure 11A:
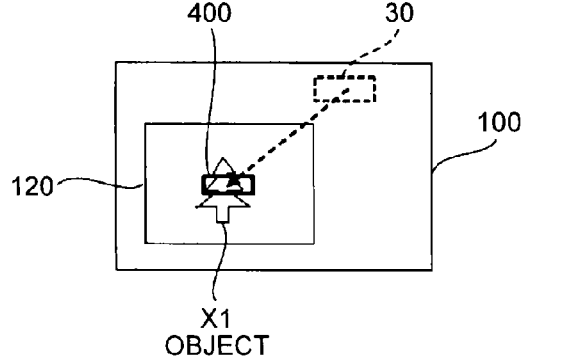
FIGS. 11A and 11D are explanatory diagrams illustrating an example of parallax in a conventional image capturing apparatus.
Figure 11B:
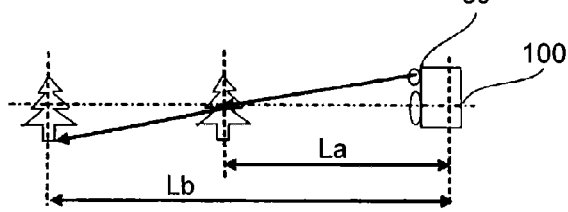
Figure 11C:
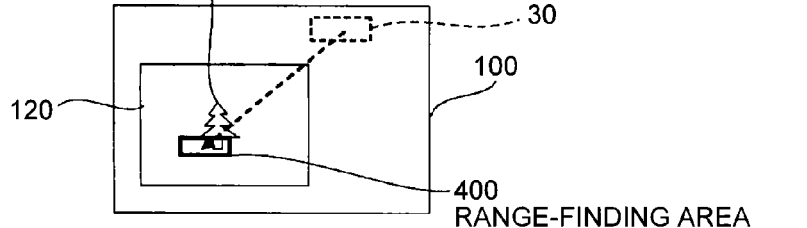
Figure 11D:
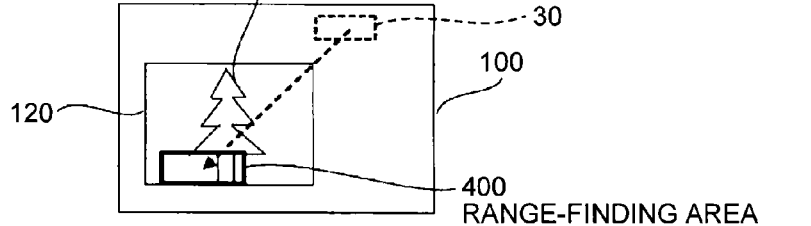

FIG. 1C is a schematic external drawing illustrating an image capturing apparatus 1a, a modification of the image capturing apparatus 1. Referring to FIG. 10, the image capturing apparatus 1a includes the image-capturing optical system 20, similar to that of the image capturing apparatus 1, and an AF optical system 30a that differs from the AF optical system 30 of the image capturing apparatus 1. The AF optical system 30a including two AF lenses 31a and 31b is configured to perform autofocusing by using AF image data pieces individually acquired through the AF lenses 31a and 31b. The release button SW1, which is a shutter switch, and the mode dial SW2 for selecting a photographing mode are provided on a top surface of the image capturing apparatus 1a.

Figure 2A:
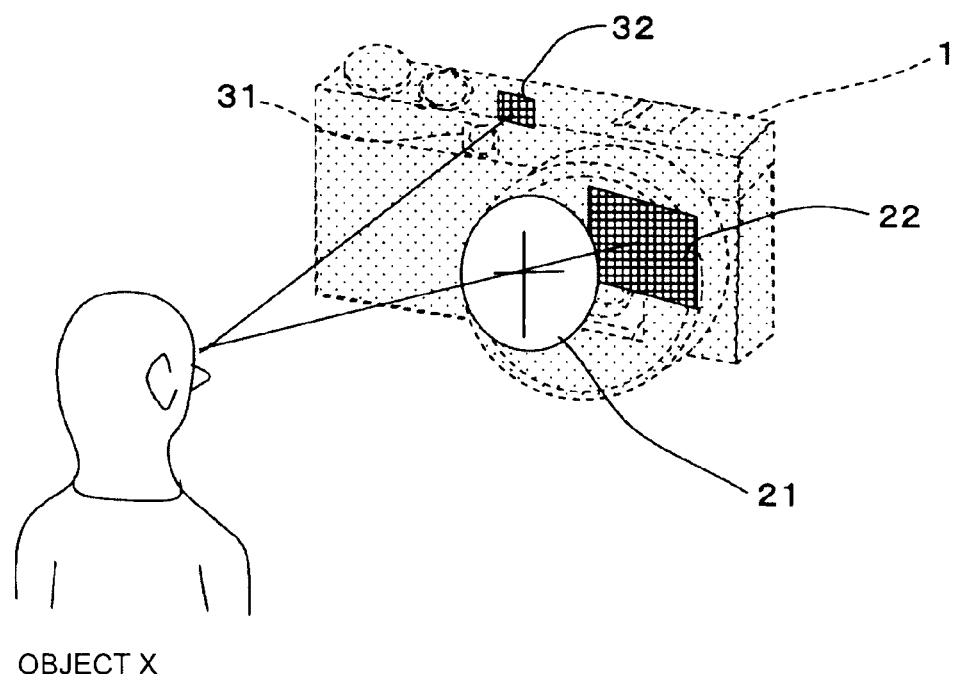
FIGS. 2A and 2B are schematic perspective views of the image capturing apparatus according to the embodiment as viewed from a front side and that of the modification.
Figure 2B:
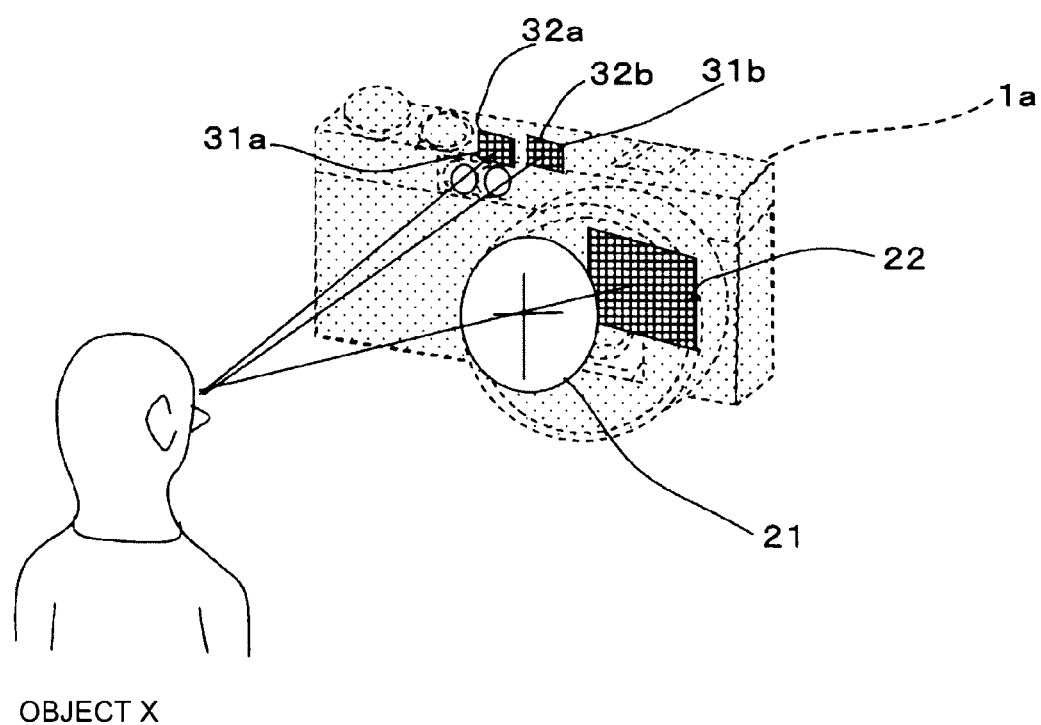

FIG. 2A is a schematic perspective view, as viewed from the front side, of the image capturing apparatus 1 illustrated in FIGS. 1A and 1B. FIG. 2B is a schematic perspective view, as viewed from the front side, of the image capturing apparatus 1a illustrated in FIG. 10. Referring to FIG. 2A, the image capturing apparatus 1 internally includes a first image sensor 22 that acquires an object image through the picture-taking lens 21. The image capturing apparatus 1 also internally includes a second image sensor 32 that acquires an object image through the AF lens 31. As illustrated in FIG. 2A, the picture-taking lens 21 and the AF lens 31 are arranged to be away from each other; accordingly, the AF lens 31 is situated in such a way that its central axis is tilted toward the picture-taking lens 21. To conform to this, the second image sensor 32 is situated in such a way that its angle of view is tilted toward the image-capturing optical system. A distance to an object X is determined by using these two optical systems by the triangulation. Hence, parallax between images of the object X obtained by the optical systems produces a "displacement" between a position of an image of the object X in primary image data and a position of an image of the object X in the AF image data. This "displacement" causes a phenomenon that the image of the object X falls out of a range-finding area (area for use in focus adjustment), resulting in failure in accurate focus adjustment, to occur.

Referring to FIG. 2B, the picture-taking lens 21, which is provided on the front side of the image capturing apparatus 1a, internally includes the first image sensor 22 that acquires primary image data through the picture-taking lens 21 and a pair of second image sensors 32a and 32b that acquire images of the object X (AF image data) through the pair of AF lenses 31a and 31b.

Figure 3:
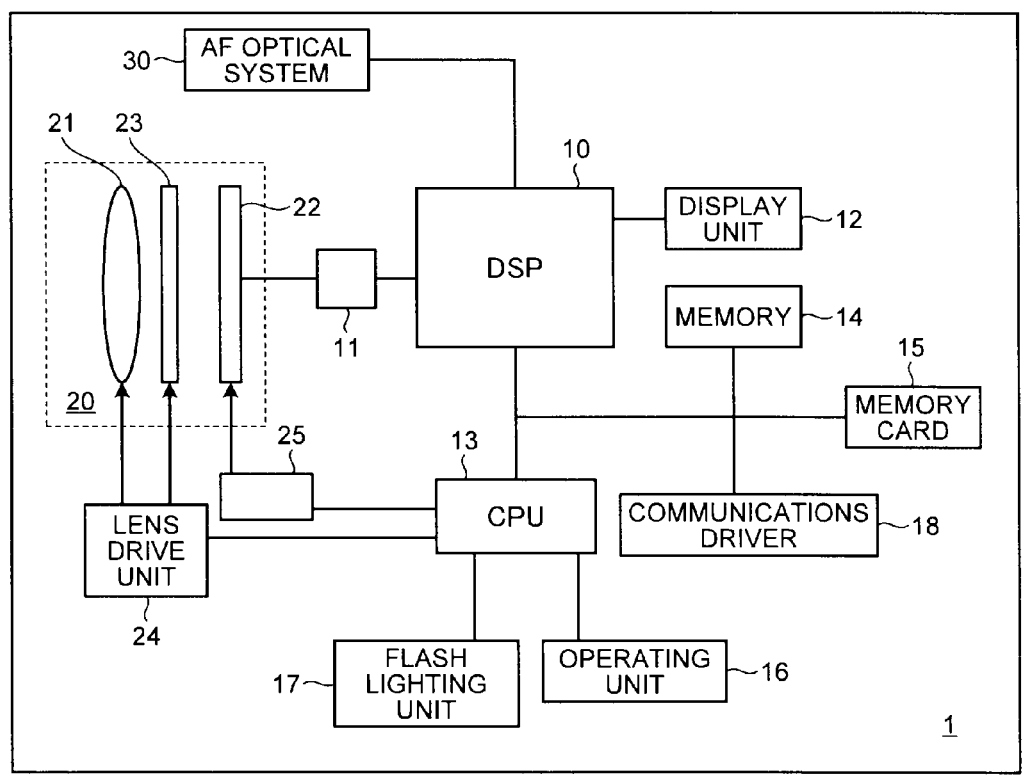
FIG. 3 is an example illustrating a functional block diagram of the image capturing apparatus according to the embodiment.

An example of functional blocks of the image capturing apparatus according to the present embodiment is described below with reference to FIG. 3. Operations (functions) of the image capturing apparatus according to the embodiment are controlled by a central processing unit (CPU) 13. The CPU 13 controls a lens drive unit 24, which is a focus control unit, causing the lens drive unit 24 to move the picture-taking lens 21 to an in-focus position. The CPU 13 also controls operations of a light control unit 23 that includes a diaphragm and a shutter. The CPU 13 also controls image acquiring operations of the AF optical system 30. More specifically, the CPU 13 controls operations for acquiring primary image data and AF image data. An object image formed through the picture-taking lens 21 on a light-receiving surface of the first image sensor 22 is converted into electric signals. The electric signals are subjected to correlated double sampling (CDS) and analog-to-digital (A/D) conversion performed by a CDS unit 11. Digital data thus-obtained, representing the object image, is fed into a digital signal processing unit (DSP) 10.

It is controlled by the CPU 13 when to feed into the DSP 10 the digital data that is obtained by subjecting output data of the first image sensor 22 to the A/D conversion performed by the CDS unit 11. Meanwhile, the digital data that is fed into the DSP 10 is a RAW-RGB data. Here, RGB is an abbreviation for red, green, and blue. The DSP 10 converts the RAW-RGB data into YUV image data, and then compresses the YUV data into Joint Photographic Experts Group (JPEG) image data. After having undergone these image signal processing operations, the image data is stored in a memory 14 and recorded in a memory card 15 as an image file. The term "YUV" of the YUV data derives from the YUV color space used to represent a color in image data as a luminance (luma) signal (Y) and color difference signals (U and V). The color difference signal (U) is a difference between a blue (B) component data and a luminance data; the color difference signal (V) is a difference between a red (R) component data and the luminance data. The DSP 10 outputs the thus-input image data to the display unit 12. The display unit 12 displays an image pertaining to the object image obtained through the picture-taking lens 21 thereon.

The CPU 13 also controls predetermined image processing to be performed by the DSP 10 on the AF image data obtained by the AF optical system 30.

The CPU 13 further performs predetermined operations corresponding to an operation signal issued when the release button SW1, the mode dial SW2, or the jog switch SW3 is operated. For example, when a first release signal is issued from the release button SW1, the CPU 13 causes the AF optical system 30 to perform an AF process. Another example is that, when a second release signal is issued from the release button SW2, the CPU 13 causes an image capturing process to be performed. A flash unit 17 includes a main capacitor for flashlight emission and the like. The CPU 13 controls flashlight emission by checking a voltage charged in the main capacitor. The CPU 13 also controls communications with external equipments connected to the image capturing apparatus via a communication driver 18.

An operation of the image capturing apparatus 1 according to the present embodiment is described below. When a photographer selects a recording mode by operating the mode dial SW2 on the image capturing apparatus 1 while power is supplied, or when a photographer selects a recording mode by operating the mode dial SW2 without a power supply and power is supplied afterward to the image capturing apparatus 1, initialization processing is started first on hardware elements constituting each processing unit of the image capturing apparatus 1.

After the initialization processing is completed, when the picture-taking lens 21 is directed to an object, an image of the object is formed through the picture-taking lens 21 on the light-receiving surface of the first image sensor 22, which outputs electric signals (analog RGB image signals) corresponding to the image. The electric signals are converted by the front-end (F/E) unit 11 into RAW-RGB data, which is digital data. The RAW-RGB data is fed into the DSP 10 and temporarily stored in the memory 14, from which the RAW-RGB data is read out and converted by the DSP 10 into YUV data, the YUV format being a displayable format on the display unit 12. The YUV data is, after the conversion from the RAW-RGB data to the YUV data, stored in the memory 14 again. Thereafter, the YUV data is read out from the memory 14 and fed via the DSP 10 to the display unit 12, on which the YUV data is displayed as a live view image. In this state (monitoring state) in which the live view image is displayed on the display unit 12, the DSP 10 performs pixel decimation and reads out 30 frames (30 images) per second. Here, the "monitoring state" is a state in which an object image obtained with the image-capturing optical system 20 is displayed on the display unit 12 and also in which the release button SW1 is not pressed (i.e., a release signal is not issued). While the monitoring processing is performed, a processing for an automatic exposure (AE) and a processing for an automatic white balance (AWB) are carried out.

The AE processing and the AWB processing are performed based on an AE evaluation value and an AWB evaluation value calculated from image data. Specifically, the AE evaluation value and the AWB evaluation value are obtained by integrating RGB values, on a per-color basis, of the RAW-RGB data fed into the DSP 10. For instance, the evaluation values are calculated by dividing a screen, corresponding to the light-receiving surface for all the pixels of the first image sensor 22, into 256 equal areas (i.e., the screen is divided into 16 divisions in the horizontal direction and 16 divisions in the vertical direction) and integrating the RGB values, on the per-color basis, of each area. The AE evaluation value and the AWB evaluation value are computed by the CPU 13 that adjusts "an electronic shutter speed (an exposure time to be measured in seconds)", which is a parameter for operating an electronic shutter, on a charge-coupled device (CCD) drive unit 25 so that each of the AE evaluation value and the AWB evaluation value has a corresponding predetermined value.

Use of the CCD drive unit 25 sets a limitation on a range of the electrical shutter speed to be within a predetermined range, beyond which the electrical shutter speed cannot be set. When the electrical shutter speed is determined by the CPU 13, based on the AE evaluation value and the AWB evaluation value, to be out of an acceptable range for the CCD drive unit 25, the CPU 13 performs adjustment by changing an aperture of the diaphragm included in the light control unit 23 via the lens drive unit 24 and changing the magnification of the first image sensor 22 as an adjustment so as to let the electrical shutter speed fall within the predetermined range. The CPU 13 also performs feedback control for adjusting an image-processing color parameter of the DSP 10 and the like. The monitoring and a state detection of an operating unit 16 are performed at every 20 milliseconds by periodical timer interruption.

In the AE process to be performed in response to detection of the first release signal, the DSP 10 evaluates the image data pertaining to the object image obtained through the picture-taking lens 21 based on the AE evaluation value and determines setting values to be assigned to the CCD drive unit 25 for exposure. The setting values include an exposure time value and a gain for the first image sensor 22. In the AF process to be performed after the AE process, a distance to the object is measured by the triangulation; the CPU 13 causes the lens drive unit 24 to move the picture-taking lens 21 to an in-focus position according to the result of the distance measurement. Thereafter, on detection of the second release signal, an image capturing process is performed by the predetermined image processing described above on image data pertaining to the object image obtained through the picture-taking lens 21 at the in-focus position and the processed image data is recorded in the memory card 15.

Figure 4:
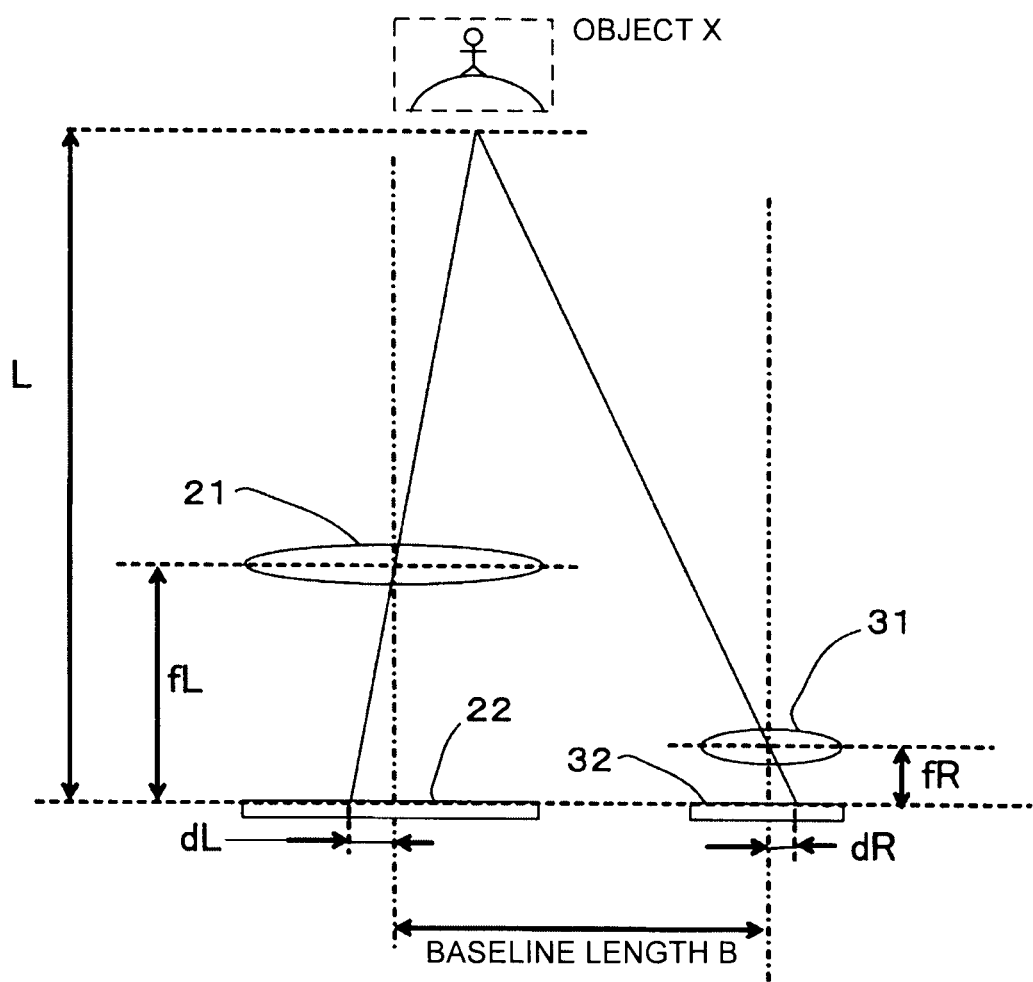
FIG. 4 is a schematic diagram illustrating an example to illustrate a distance-measuring method to be performed by the image capturing apparatus according to the embodiment.

A method of measuring an object distance, which features an image capturing method according to an aspect of the present invention, is described below with reference to relevant drawings. First, an overview of the distance measuring method to be performed by the image capturing apparatus according to the embodiment is described below with reference to FIG. 4. FIG. 4 illustrates, of the image-capturing optical system 20 and the AF optical system 30 belonging to the image capturing apparatus 1, only the picture-taking lens 21, the first image sensor 22, the AF lens 31, and the second image sensor 32 with other constituent elements being omitted. The object X is to be photographed. FIG. 4 schematically illustrates the image capturing apparatus 1 as viewed from a top side.

Referring to FIG. 4, the picture-taking lens 21 is apart from the AF lens 31 by a baseline length B. The picture-taking lens 21 has a focal length fL; the AF lens 31 has a focal length fR. Meanwhile, fL is m times as large as fR, or, put another way, the relationship between fL and fR can be represented as fL=m×fR. A position (first image forming position) of the light-receiving surface of the first image sensor 22, on which the image of the object X is formed through the picture-taking lens 21, is displaced outward, along the base line, from the baseline length B by dL. A position (second image forming position) of the light-receiving surface of the second image sensor 32, on which the image of the object X is formed through the AF lens 31, is displaced outward, along the base line, from the baseline length B only by dR. In other words, the first image forming position of the image of the object X, which is the target of the distance measurement, is away from a center of the first image sensor 22 only by dL; the second image forming position is away from a center of the second image sensor 32 by dR.

Under the conditions described above, a distance L to the object X can be calculated by $\{(B+dL+dR)\times m\times fR\}/(dL+m\times dR)$. The baseline length B is determined at a manufacturing stage of the image capturing apparatus 1. The focal length ratio m, which depends on the focal length fL of the picture-taking lens 21, can be determined by the position of the AF lens 31 because the CPU 13 can obtain a value of the focal length fL via the lens drive unit 24. Hence, the distance L to the object X can be obtained by determining dL and dR.

As described above, "determining dL and dR" means "determining positions where object images are formed on the image sensors", which is tantamount to "determining an image data area (range-finding area) for use in calculating an object distance".

The image capturing apparatus 1a equipped with the AF optical system 30a includes, in addition to the picture-taking lens 21, the AF lenses 31a and 31b. Accordingly, the image capturing apparatus 1a can calculate the distance L to the object X from image data obtained with the two lenses provided in the AF optical system 30a and the second image sensor 32. The distance L to the object X can be obtained from $\{(B+dL+dR)\times f\}/(dL+dR)$ because the AF lenses 31a and 31b have the same focal length (fL=fR=f). As described, irrespective of whether or not the two lenses (on the L side and the R side) for use in distance measurement have the same focal length, the distance to the object X can be obtained by determining positions where object images are formed relative to the baseline length B.

Figure 5:
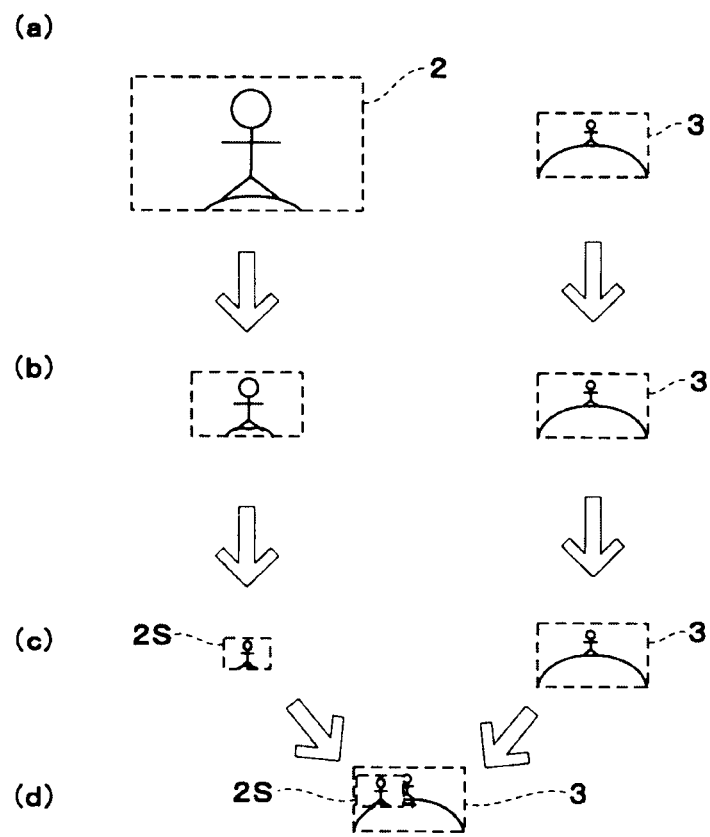
FIG. 5 is a schematic diagram illustrating how the distance-measuring method is performed by the image capturing apparatus.

Operations to be performed by the image capturing apparatus according to the embodiment to determine dL and dR are described below. FIG. 5 is a schematic diagram illustrating an overview of the operations. Referring to FIG. 5, reference numeral 2 denotes primary image data obtained by the image-capturing optical system 20; 3 denotes AF image data obtained by the AF optical system 30. The primary image data 2 and the AF image data 3 differ from each other in image size and angle of view. The primary image data 2 generally has a larger image size and a smaller angle of view.

In comparing the primary image data 2 with the AF image data 3, the primary image data 2 is first resized to the image size of the AF image data 3. FIG. 5(b) illustrates how resizing is performed. The resizing is performed by the DSP 10 controlled by the CPU 13.

Subsequently, to equalize the angle of view between the primary image data 2 and the AF image data 3, reducing a size of the primary image data 2 by using the focal length ratio m between the focal length of the picture-taking lens 21 and that of the AF lens 31. Reference symbol and numeral 2S denote image data obtained by reducing the size of the primary image data 2 (FIG. 5(c)).

Subsequently, by comparing the size-reduced image data 2S and the AF image data 3, an image-formed position of the object X is determined as the position where maximum coincidence is obtained between the images.

Figure 6:
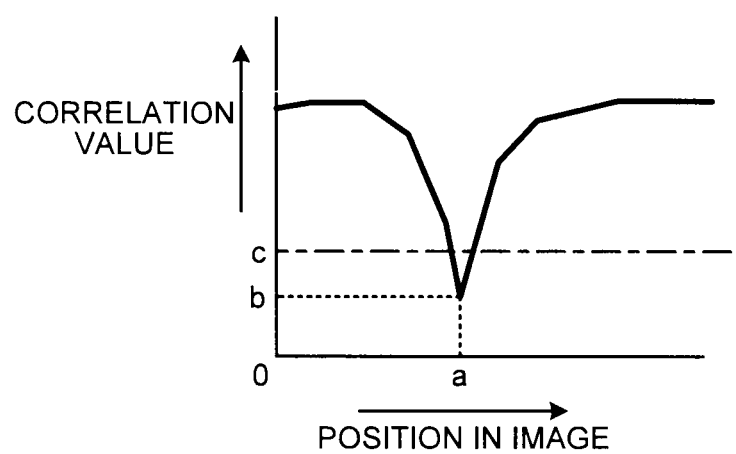
FIG. 6 is a graph illustrating a variation of a correlation value obtained by the distance-measuring method performed by the image capturing apparatus.

The degree of coincidence between the images is calculated as a sum of differences between a luminance array of the AF image data 3 and a luminance array of the reduced image data 2S. This summation is referred to as a correlation value. The correlation value is minimized when the degree of coincidence between the images is maximized. The correlation value is calculated by scanning the AF image data 3 along an X coordinate direction and a Y coordinate direction to take a difference with data in a corresponding position contained in the reduced-size image data 2S. FIG. 6 is an illustrating example showing a variation of the correlation value. In FIG. 6, a horizontal coordinate represents the coordinate of the image, while a vertical coordinate represents the correlation value. In this example, the degree of coincidence is maximized when an image position in the image is at "a", where the correlation value becomes "b".

As illustrated in FIG. 6, even when the degree of coincidence is maximized, the correlation value does not vanish. If the reduced image data 2S has been simply cut out from the AF image data 3, the correlation value may vanish at a position where images match. However, the primary image data 2, from which the reduced image data 2S is derived, and the AF image data 3 differ from each other in image size and angle of view as described above and therefore have subtle differences in angles and in degree of blur in the image of the object X. Accordingly, the correlation value does not vanish even at the position where the degree of coincidence is maximized.

The degree of blur of an image obtained by the image-capturing optical system 20, which obtains the primary image data 2, varies greatly, in particular, depending on a position of the focusing lens. When the image-capturing optical system 20 has obtained so-called an out-of-focus image, image comparison may result in an erroneous determination. To prevent such an erroneous determination, a confidence level of the degree of coincidence is judged based on the correlation value. In FIG. 6, a line with a symbol "c" indicates a confidence-level threshold value. When a smallest correlation value is larger than the threshold value "c", it is determined that confidence level is low, and distance measurement by using the AF optical system 30 is not performed and contrast AF (the hill-climbing AF method), by using the image-capturing optical system 20, is employed instead to determine an in-focus position.

Figure 7:
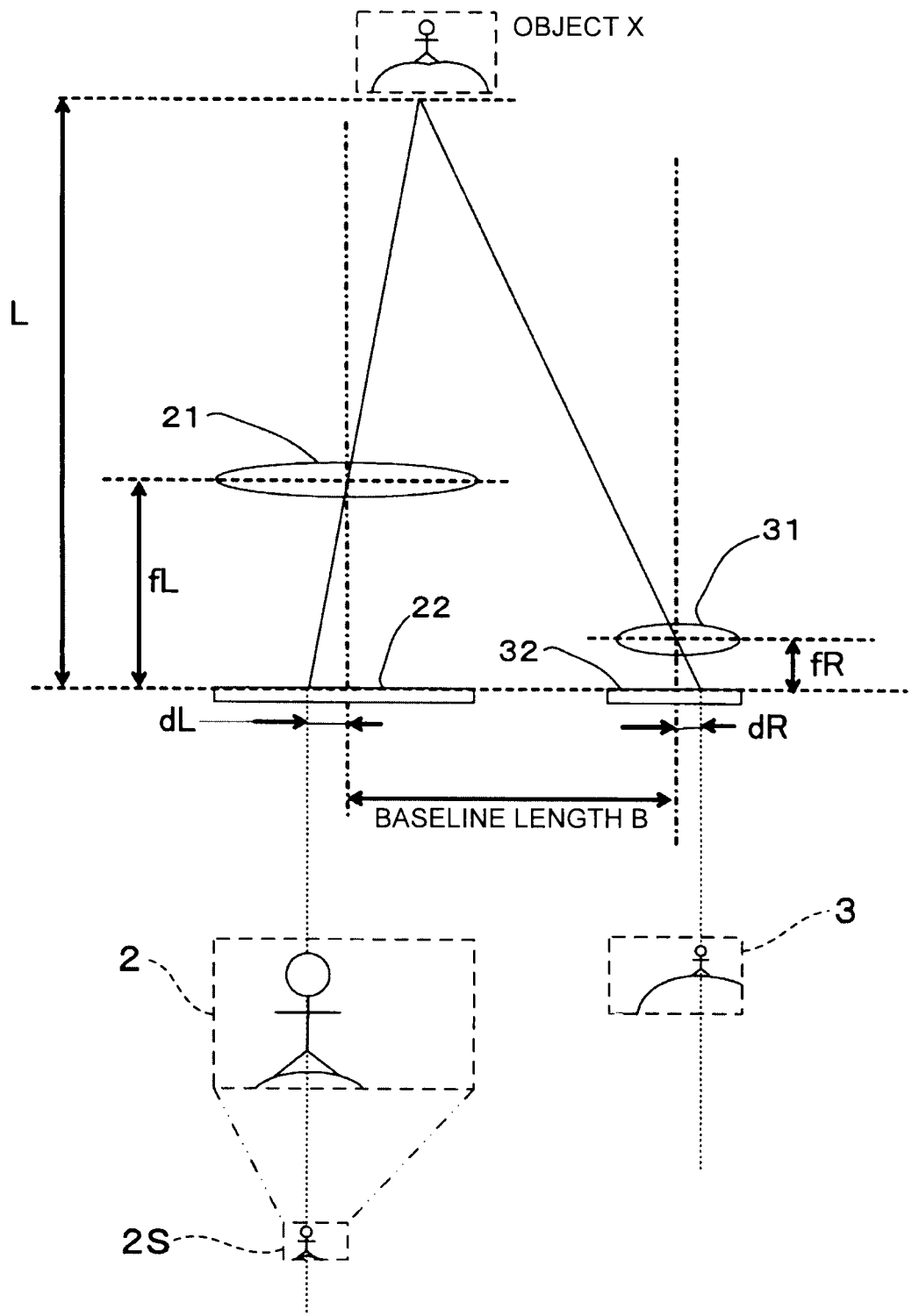
FIG. 7 is a schematic diagram illustrating an example of the distance-measuring method to be performed by the image capturing apparatus according to the embodiment.

A distance measurement method for use in the AF process performed by the image capturing apparatus 1 in the present invention is described below. As illustrated in FIG. 7, the picture-taking lens 21 is apart from the AF lens 31 by the baseline length B that produces parallax. A focus position can be located from an entire area represented by the primary image data 2; however, this can unfavorably lengthen processing time. To avoid this, a certain image area in the area represented by the primary image data 2 may be designated as a range-finding area, and a correlation value may be calculated from image data pertaining to the range-finding area. Alternatively, a configuration may be employed such that a predetermined image area containing a position designated by a photographer on a live view image displayed on the display unit 12 is set as the range-finding area. In the descriptions below, it is assumed that the range-finding area is designated in the vicinity of a center of an image of the object X.

Figure 8:
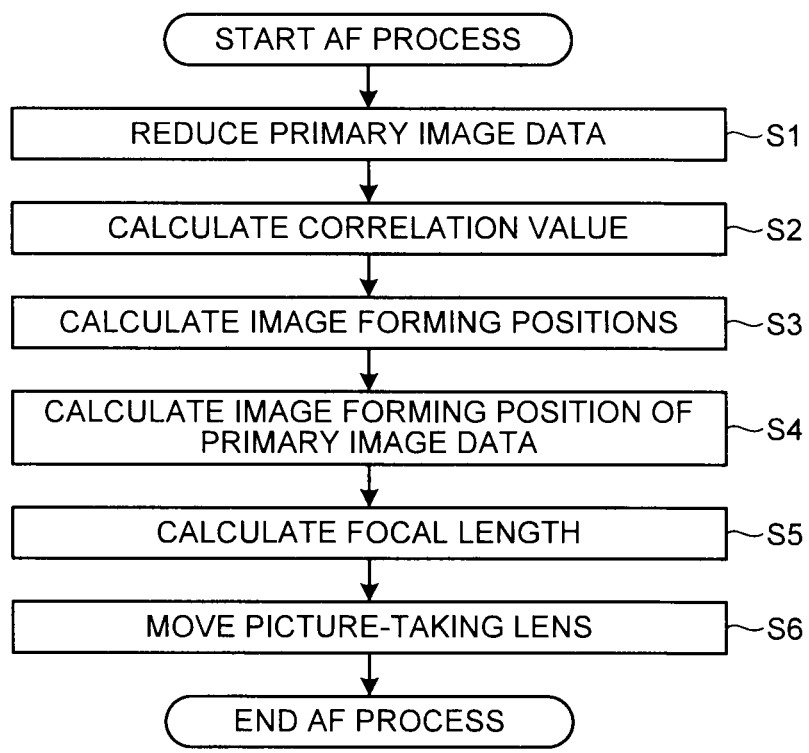
FIG. 8 is a flowchart of an example illustrating an image capturing process to be performed by the image capturing apparatus according to the embodiment.

FIG. 8 is a flowchart of an example of the AF process to be performed by the image capturing apparatus according to the embodiment. Each processing step is denoted by S1, S2, S3, . . . , and so on.

On detection of the first release signal issued in response to photographer's operation with the release button SW1, the AF process starts. First, reducing a size of the primary image data 2 obtained with the image-capturing optical system 20 is performed (S1). A size reduction processing is performed as follows. The primary image data 2 is resized down to the image size of the AF image data 3 obtained with the AF optical system 30. Thereafter, the object image contained in the primary image data 2 is reduced in size by using the focal length ratio m between the picture-taking lens 21 and the AF lens 31 without changing the image size of the primary image data 2. Alternative method of size reduction is to resize the AF image data 3 so as to match the image size of the primary image data 2 and, thereafter, to enlarge the object image contained in the AF image data 3 by using the focal length ratio m without changing the image size of the AF image data 3. Note that employable scheme is not limited to those described above, and any scheme for equalizing a size of the object image contained in the primary image data 2 to a size of the object image contained in the AF image data 3 can be employed.

When a horizontal coordinate and a vertical coordinate of the primary image data 2 are denoted by x and y, respectively, the primary image data 2 can be represented by a two-dimensional array Ym1[x][y]. By reducing a size of the primary image data 2 stored in this array Ym1 by the focal length ratio m, a two-dimensional array Ym2[x][y] representing the reduced image data 2S is obtained. The size of an image of the object X in the reduced image data 2S coincides with the size of the image of the AF image data 3. (see FIG. 7).

Calculation of correlation values between the reduced image data 2S and the AF image data 3 is performed in a next step (S2). When a horizontal coordinate and a vertical coordinate of the AF image data are denoted by k and 1, respectively, the AF image data 3 can be represented by a two-dimensional array afY[k][l]. Each of Ym2[x][y] representing the reduced image data 2S and afY[k][l] representing the AF image data is a luminance array. Accordingly, by subtracting individual elements (luminance values of pixels) in one of the arrays from corresponding elements in the other array and calculating a summation of the thus-obtained differences, a correlation value at a given pair of indices (k, l) representing a relative displacement of the array Ym2[x][y] against afY[k][l], or, put another way, a correlation value at each image position in the AF image data 3, can be obtained. This calculation of the summation of differences between the arrays is referred to as a correlation value calculation (S2).

The correlation value calculation (S2) is performed by using Equation (1):

$$(\text{correlation value}) = \Sigma(|Ym2[x][y] - afY[k+x][l+y]|) \quad (1).$$

Calculation with Equation (1) is described below using an example where Ym2[x][y], which is the luminance array representing the reduced image data 2S with two-dimensional (2D) coordinates (x, y) and a dimension of (400, 300), while afY[k][l], which is the luminance array representing the AF image data 3 with 2D coordinates (k, l) and a dimension of (900, 675). First step to evaluate the correlation value between Ym2[x][y] and afY[k][l] by a computation according to Equation 1 is to set a horizontal coordinate k of afY[k][l] as k=0, and let a vertical coordinate l of afY[k][l] vary from 0 to 500. Next step is to set the horizontal coordinate k as k=1 and to let the vertical coordinate l vary from l=0 to l=375. The computation is repeatedly performed until k reaches 500. For example, when Ym2[x][y] is located at the coordinates corresponding to an upper-left corner of afY[k][l], the correlation value becomes minimum for k=500 and l=0.

In this way, the 2D indices (k, l), at which a summation of absolute values obtained by subtracting the luminance array afY[k][l] from the luminance array Ym2[x][y] is maximized, indicate a relative displacement of the 2D coordinates where the reduced image data 2S and the AF image data 3 coincide with each other.

Meanwhile, in the example described above, the correlation value calculation (S2) is performed by searching through the entire area of the AF image data 3 with reference to the reduced image data 2S. Alternatively, calculations can be performed in a decimated manner to reduce the number of calculations to be performed. In a situation where a photographer has designated a range-finding area, the correlation value calculation can be performed only on an image area in the reduced image data 2S corresponding to the designated range-finding area.

In a subsequent process (S3), displacements dL' and dR, relative to the baseline length B are calculated. Here, dL' and dR correspond to the second image forming position for the 2D coordinates (k, l) on the AF image data 3 obtained at a process for the correlation value calculation (S2). The length dL' indicates a position, relative to the baseline length B, where the object image represented by the reduced image data 2S is formed. The correlation value calculation (S2) is performed at a resolution of pixels; accordingly, each of dR and dL' is determined in units of pixels of the AF image data 3.

Next step is to resize the reduced image data 2S back to the original size of the primary image data 2 (S4). The first image forming position dL is obtained by multiplying dL' by the focal length ratio m in an image-forming position calculation of primary image data (S4).

Assigning the dR and dL, which are obtained by the above-described method, to Equation (1) yields the distance L to the object X (S5). The thus-obtained L is converted to a displacement length of the picture-taking lens 21, and the lens drive unit 24 moves the picture-taking lens 21 by the displacement length to a focal position (S6) accordingly to finish the AF process. The conversion from the distance L into the displacement length can be performed by using, for instance, an adjustment coefficient stored beforehand in the image capturing apparatus 1.

As described above, the image capturing apparatus including the two optical systems can calculate, even when there is parallax between the optical systems, a distance to an object by using correlation between the primary image data 2 and the AF image data 3.

Still another example of the AF process to be performed by the image capturing apparatus according to the embodiment is described below. For an image capturing apparatus such as the image capturing apparatus 1a that includes two second image sensors 32a and 32b in the AF optical system 30a, dL and dR can be obtained as follows. The primary image data 2 is obtained through the picture-taking lens 21. The size-reduced image data 2S is calculated by using the focal length ratio m between the AF lenses 31a and 31b. The correlation value calculation (S2) is performed by using the size-reduced image data 2S and each of AF image data 3a obtained through the AF lens 31a and AF image data 3b obtained through the AF lens 31b.

In general, a depth of field of an AF optical system is relatively large, while a depth of field of an image-capturing optical system is less large. Accordingly, when primary image data is out of focus to a large extent, a correlation value between the primary image data and AF image data can be less accurate. However, the image capturing apparatus of the embodiment is capable of calculating a relatively accurate focal length even when AF image data and primary image data have a parallax. This is because the image capturing apparatus determines an approximate image forming position from correlation values between the primary image data 2 and the AF image data 3, and thereafter performing the correlation value calculation on the thus-determined approximate image forming position by using the AF image data 3a and the AF image data 3b obtained through the AF lens 31a and the AF lens 31b, respectively, thereby obtaining more accurate correlation values and calculating an image forming position based on the more accurate correlation values.

In the image capturing apparatus of the embodiment described above, the focal length ratio between the image-capturing optical system 20 and the AF optical system 30a is set to m; however, the focal length ratio is not limited to m. Alternatively, a plurality of approximate values of m can be stored as scaling factors of reduced image data in advance, and one of the scaling factors, at which a correlation value is minimized, can be selected as an actual scaling factor and assigned to Equation (1). This allows more accurate distance measurement not from a theoretical design value but from a value that agrees with an actual image data.

Figure 9:
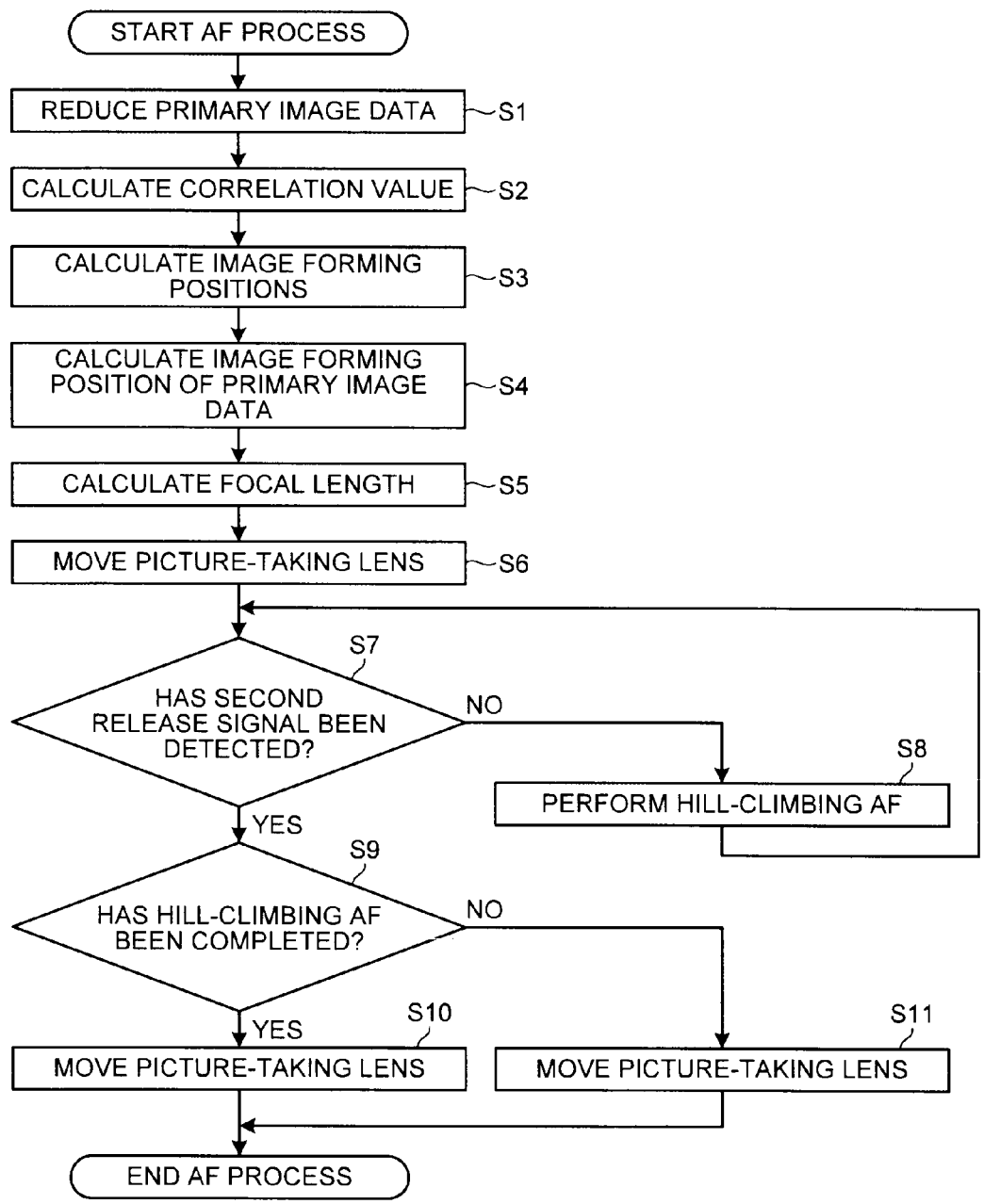
FIG. 9 is a flowchart of another example illustrating an image capturing process to be performed by the image capturing apparatus according to the embodiment.

Another example of the AF process to be performed by the image capturing apparatus according to the embodiment is described below with reference to the flowchart presented in FIG. 9. Same processing as that of the flowchart presented in FIG. 8 is denoted by the same reference symbol and numeral. Descriptions about processing having already been described above with reference to FIG. 8 are omitted.

On detection of the first release signal issued in response to photographer's operation with the release button SW1, the AF process starts. The distance L to the object X is obtained by the correlation value calculation described above; the distance L is converted into a displacement length of the picture-taking lens 21; the picture-taking lens 21 is moved to an in-focus position (S1 through S6). Thereafter, over a period in which a second release signal issued from the release button SW1 is not detected (NO at S7), contrast values (AF evaluation values) of the primary image data 2 in the vicinity of the in-focus position, to which the picture-taking lens 21 has been moved at S6, are calculated, thereby determining a lens position where the AF evaluation value is maximized by means of the hill-climbing AF method (S8). If the hill-climbing AF method has been completed when the second release signal is detected (YES at S9), the lens drive unit 24 moves the picture-taking lens 21 to the thus-determined lens position where the AF evaluation value is maximized (S10). Then, the AF process ends. On the other hand, if the hill-climbing AF method has not been completed yet when the second release signal is detected (NO at S9), the lens drive unit 24 moves the picture-taking lens 21 to a position corresponding to the focal length fL obtained at S5 (S11). Then, the AF process ends.

When a time interval between detection of a first release signal and detection of a second release signal is short (i.e., a time difference between detection of the first release signal and the second release signal falls within a predetermined range), that is, the release button SW1 has been pressed fully in one stroke, it is presumed that a photographer desires to take a picture instantly. For such a situation, an image is desirably captured at the lens position corresponding to the focal length L obtained by performing processing S1 through S5 because there is no time to perform the hill-climbing AF method (S8) which is performed in the embodiment described above.

The image capturing apparatus 1 according to the present embodiment performs the AF process only by the triangulation, thereby allowing a picture to be taken immediately in response to a shutter operation of a photographer. The image capturing apparatus 1 is also capable of, in a situation where the time interval has a certain length, obtaining a more accurately focused image by combining the triangulation and the hill-climbing AF method.

The AF image data 3 can be monochrome image data because data containing only luminance signals can satisfactorily function as the AF image data 3. Accordingly, a high-speed image sensor is typically used as the second image sensor 32 for use in the AF optical system 30. This is because, in contrast to the first image sensor 22 in the image-capturing optical system 20, it is not necessary for the second image sensor 32 to include an RGB filter. Instead, an image sensor used for the second image sensor 32 may have a very high sensitivity. If it is determined that an object image represented by the primary image data 2 is too dark in reducing the primary image data (S1) or the like of the present embodiment, the hill-climbing AF method by using the primary image data 2 becomes less accurate. Accordingly, in such a case, the AF process is desirably performed only by the triangulation.

Still another example of the AF process to be performed by the image capturing apparatus according to the embodiment is described below with reference to the flowchart presented in FIG. 10. Same processing as that of the flowchart presented in FIG. 8 is denoted by the reference symbol and numeral and repeated descriptions are omitted. Even when the image-capturing optical system 20 has obtained the primary image data 2 with the object image at a center, in a situation where the object is relatively close to the picture-taking lens 21 or another object is behind the object and the other object is focused on by the AF optical system 30, a reliable correlation value cannot be obtained from the correlation value calculation (S2), which has been described above, by using the primary image data 2 and the AF image data 3. There may also be a case in which a correlation value does not have any minima.

For such a situation, as presented in the flowchart of FIG. 10, after a correlation-value evaluation (S2-1) is carried out for evaluating the correlation value obtained at the correlation value calculation (S2), image-forming-position calculation (S3) is preferably performed. The correlation-value evaluation (S2-1) can be performed, for instance, by comparing a minimum value, obtained by correlation value calculations, with a predetermined threshold, and when a minimum value of correlation is smaller than the threshold (YES at S2-1), it is determined that the correlation value is reliable, and process control proceeds to the image-forming-position calculation (S3). On the contrary, if the result of the comparison is that the correlation value is larger than the threshold (NO at S2-1), it is determined that the correlation is not reliable, and the hill-climbing AF method is performed starting from a close point to the image-capturing optical system 20 toward a distant point (S2-2), and the AF process ends.

An image capturing apparatus according to still another embodiment of the present invention is described below. In the image capturing apparatus of the already-described embodiment, the image-capturing optical system 20, serving as the first optical system, and the AF optical systems 30, 30*a*, serving as the second optical systems, are provided in the image capturing apparatus; however, they are not limited to image capturing apparatuses. The second optical systems 30 and 30*a* can be provided as external equipments because the image capturing apparatus according to the present invention relates to a calculation of a distance to an object by using image data obtained from two optical systems. For instance, the image capturing apparatus 1 or 1*a* can include communication interface that is connectable to an external optical system provided in external equipment. When an external optical system serving as a second optical system is connected to the communication interface, the CPU 13 can control the DSP 10 to exchange the primary image data 2, the AF image data 3, and commands for use in operation control with the external optical system.

The image capturing apparatus, to which an external optical system is connectable, according to the other embodiment can measure an object distance accurately from the primary image data 2 obtained by the image-capturing optical system 20 and the AF image data 3 obtained by the external optical system without being affected by parallax. This can be achieved by modifying firmware for controlling operations of the external optical system.

An image capturing apparatus according to a still another embodiment of the present invention can be configured such that the external optical system communicably connected to the image capturing apparatus includes, in addition to the image sensors, a processing unit that can perform the correlation value calculation (S2) and the image-forming-position calculation (S3). In this embodiment, primary image data is transmitted from the image capturing apparatus via the communication interface to the external optical system. The external optical system receives the primary image data from the AF optical system and the image capturing apparatus and performs the correlation value calculation (S2), the image-forming-position calculation (S3), image-forming position calculation of the primary image data (S4), and the focal length calculation (S5) and returns a result of these operations to the image capturing apparatus. The image capturing apparatus causes the lens drive unit to move the picture-taking lens according to the thus-returned focal length.

According to this embodiment, connecting the external optical system to the image capturing apparatus that does not internally include an external optical system allows the image capturing apparatus to calculate an accurate focal length without being influenced by parallax and to perform the AF process at a high speed.

The image capturing apparatus can include a mechanism for changing the focal length in the AF lens belonging to the AF optical system. With such a mechanism being mounted on the image capturing apparatus, when a focal length is changed by a photographer, a focal length of the AF lens can be changed accordingly. If the picture-taking lens and the AF lens have different focal-length variable areas, the focal length of the AF lens can be adjusted to a focal length closest to a focal length of the picture-taking lens. This allows more accurate calculation of the distance to an object.

According to an aspect of the present invention, range finding can be performed without being displaced from a central position of an object to be photographed independent of a distance to the object or a zooming status. Furthermore, range finding can be performed at a position designated by a photographer on a live view image without being displaced from the designated position. By combining the triangulation and the hill-climbing AF method, accurate range finding can be performed quickly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing apparatus having an automatic focusing function for automatically focusing on an object to be photographed, the image capturing apparatus comprising:
    a first image-obtaining unit that includes a picture-taking lens, the picture-taking lens including a focusing lens, and a first imaging sensor and obtains first image data by photoelectric conversion, performed by the first imaging sensor, of a first image of the object formed through the picture-taking lens;
    a second image-obtaining unit that includes a range-finding lens and a second imaging sensor and obtains second image data by photoelectric conversion, performed by the second imaging sensor, of a second image of the object formed through the range-finding lens;
    a range finder that calculates a distance to the object by using the first image data and the second image data; and
    a focus control unit that moves the focusing lens according to the distance calculated by the range finder to attain focus on the object, wherein
    the range finder includes:
        an image-forming-position determining unit that determines a first image forming position, at which the first image of the object is formed on a light-receiving surface of the first image sensor, and a second image forming position, at which the second image of the object is formed on a light-receiving surface of the second image sensor; and
        a distance calculating unit that calculates a distance to the object based on the first image forming position and the second image forming position.

2. The image capturing apparatus according to claim 1, wherein the image-forming-position determining unit determines the first image forming position and the second image forming position by computing correlation between the first image of the object contained in the first image data and the second image of the object contained in the second image data.

3. The image capturing apparatus according to claim 2, wherein the image-forming-position determining unit performs obtaining size-reduced image data, the size-reduced image data containing an object image equal in size to the second image of the object contained in the second image data, by reducing a size of the first image data with a focal length ratio between a focal length of the picture-taking lens and a focal length of the range-finding lens,
    determining a coincidence position, at which a luminance array of the size-reduced image data coincides with a luminance array of the second image data, and
    determining the first image forming position and the second image forming position based on the coincidence position.

4. The image capturing apparatus according to claim 1, wherein the image-forming-position determining unit performs
    obtaining size-reduced image data, the size-reduced image data containing an object image equal in size to the second image of the object contained in the second image data, by reducing the first image data with a focal length ratio between a focal length of the picture-taking lens and a focal length of the range-finding lens,
    calculating a summation of differences between numerical data in a luminance array of the size-reduced image data and numerical data in a luminance array of the second image data, and
    determining a position where the summation is minimized, thereby determining the first image forming position and the second image forming position.

5. The image capturing apparatus according to claim 1, wherein
    the range-finding lens includes a pair of lenses that are away from each other by a baseline length,
    the second image-obtaining unit includes two image sensors, each of the image sensors being the second image sensor, and
    the range finder calculates a distance to the object by using images of the object independently obtained by the two second image sensors.

6. The image capturing apparatus according to claim 1, further comprising a focusing unit that obtains a plurality of image data pieces sequentially by gradually moving the focusing lens, each of the image data pieces being the first image data, obtains a contrast value from each of the first image data pieces, and determines a focusing lens position where the contrast value is maximized, wherein
    the focus control unit selects any one of moving the focusing lens according to the distance calculated by the range finder and moving the focusing lens according to the focusing lens position determined by the focusing unit.

7. The image capturing apparatus according to claim 1, further comprising a focusing unit that obtains a plurality of image data pieces sequentially by gradually moving the focusing lens, each of the image data pieces being the first image data, obtains a contrast value from each of the first image data pieces, and determines a focusing lens position where the contrast value is maximized, wherein
    when the rangefinder is incapable of calculating the distance, the focus control unit moves the focusing lens according to the focusing lens position determined by the focusing unit.

8. The image capturing apparatus according to claim 1, further comprising a focusing unit that obtains a plurality of image data pieces sequentially by gradually moving the focusing lens, each of the image data pieces being the first image data, obtains a contrast value from each of the first image data pieces, and determines a focusing lens position where the contrast value is maximized, wherein when a first release signal issued from a shutter button is detected, the range finder is activated, and the focus control unit moves the focusing lens to the position determined by the range finder, and when, thereafter, a second release signal issued from the shutter button is detected, the focusing unit is activated, and the focus control unit moves the focusing lens to the focusing lens position determined by the focusing unit.

9. The image capturing apparatus according to claim 1, further comprising a focusing unit that obtains a plurality of image data pieces sequentially by gradually moving the focusing lens, each of the image data pieces being the first image data, obtains a contrast value from each of the first image data pieces, and determines a focusing lens position where the contrast value is maximized, wherein when a time difference between detection of a first release signal and a second release signal issued from a shutter button falls within a predetermined range, the focusing unit is not activated, and the focus control unit moves the focusing lens to the positions determined by the range finder.

10. The image capturing apparatus according to claim 1, further comprising a communication unit that communicably connects the image capturing apparatus with external equipment, wherein the range finder receives image data obtained by and fed from the external equipment via the communication unit as the second image data, and the range finder calculates the distance to the object from the second image data received via the communication unit.

11. The image capturing apparatus according to claim 1, further comprising a communication unit that communicably connects the image capturing apparatus with external equipment, the external equipment including:

a second image obtaining unit that includes a range-finding lens and a second image sensor, the second image sensor obtaining an image of an object through the range-finding lens; and a range finder that calculates a distance to the object by using the first image data fed from the image capturing apparatus via the communication unit and the second image data obtained by the second image obtaining unit, wherein the focus control unit moves the focusing lens according to the distance calculated by the range finder and received via the communication unit.

12. The image capturing apparatus according to claim 1, wherein a focal length of the range-finding lens is variable.

13. An image capturing method performed by an image capturing apparatus having an automatic focusing function, the image capturing apparatus including:

a first image-obtaining unit that includes a picture-taking lens, the picture-taking lens including a focusing lens, and a first imaging sensor and obtains first image data by photoelectric conversion, performed by the first imaging sensor, of a first image of the object formed through the picture-taking lens;

a second image-obtaining unit that includes a range-finding lens and a second imaging sensor and obtains second image data by photoelectric conversion, performed by the second imaging sensor, of a second image of the object formed through the range-finding lens;

a range finder that calculates a distance to the object by using the first image data and the second image data; and a focus control unit that moves the focusing lens to attain focus on the object according to the distance calculated by the range finder, the range finder including:

an image-forming-position determining unit that determines a first image forming position, at which the first image of the object is formed on a light-receiving surface of the first image sensor, and a second image forming position, at which the second image of the object is formed on a light-receiving surface of the second image sensor; and a distance calculating unit that calculates a distance to the object by using the first image forming position and the second image forming position, the image capturing method comprising:

determining, by the image-forming-position determining unit, the first image forming position, at which the first image of the object is formed on the light-receiving surface of the first image sensor, and the second image forming position, at which the second image of the object is formed on the light-receiving surface of the second image sensor; and calculating, by the distance calculating unit, the distance to the object by using the first image forming position and the second image forming position.

* * * * *